(12) United States Patent
Devine

(10) Patent No.: US 7,243,674 B2
(45) Date of Patent: Jul. 17, 2007

(54) COLLAPSIBLE ENCLOSURE

(76) Inventor: Michael J. Devine, 4737 Long Bow Rd., Jacksonville, FL (US) 32210

( * ) Notice: Subject to any disclaimer, the term of this patent is extended or adjusted under 35 U.S.C. 154(b) by 362 days.

(21) Appl. No.: 10/681,967

(22) Filed: Oct. 9, 2003

(65) Prior Publication Data
US 2005/0077292 A1 Apr. 14, 2005

(51) Int. Cl.
*F16L 7/00* (2006.01)
(52) U.S. Cl. ................ 137/375; 137/375; 137/341; 137/382
(58) Field of Classification Search ........... 220/4.28, 220/4.29, 6, 610, 666, 693, 692, 592.2; 137/377, 137/341, 375, 382
See application file for complete search history.

(56) References Cited

U.S. PATENT DOCUMENTS

| | | | | |
|---|---|---|---|---|
| 2,667,398 A * | 1/1954 | Claflin | ............ | 312/265 |
| 2,692,064 A * | 10/1954 | Koester | ............ | 217/12 R |
| 3,348,723 A * | 10/1967 | Wilson | ............ | 220/6 |
| 3,648,299 A * | 3/1972 | Durst | ............ | 4/524 |
| 3,966,285 A * | 6/1976 | Porch et al. | ............ | 312/265.4 |
| 4,558,206 A * | 12/1985 | Ball | ............ | 392/468 |
| 4,726,394 A * | 2/1988 | Devine | ............ | 137/341 |
| 4,777,675 A * | 10/1988 | Letner | ............ | 4/599 |
| 4,798,239 A * | 1/1989 | Persohn et al. | ............ | 165/45 |
| 4,889,252 A * | 12/1989 | Rockom et al. | ............ | 229/103.11 |
| 4,890,638 A * | 1/1990 | Davenport | ............ | 137/382 |
| RE33,523 E * | 1/1991 | Devine | ............ | 137/341 |
| 4,993,450 A * | 2/1991 | Dunn | ............ | 137/382 |
| 5,078,171 A * | 1/1992 | Moore et al. | ............ | 137/15.08 |
| 5,588,549 A * | 12/1996 | Furtner | ............ | 220/7 |
| 5,609,784 A * | 3/1997 | Davenport | ............ | 219/385 |
| 5,743,289 A * | 4/1998 | Griffin et al. | ............ | 137/341 |
| 5,791,098 A * | 8/1998 | Thomas | ............ | 52/169.6 |
| 5,862,931 A * | 1/1999 | Cox et al. | ............ | 220/6 |
| 5,957,156 A * | 9/1999 | Hartley | ............ | 137/377 |
| 5,996,611 A * | 12/1999 | Griffin et al. | ............ | 137/341 |
| 6,006,918 A * | 12/1999 | Hart | ............ | 206/600 |
| 6,021,804 A * | 2/2000 | Griffin et al. | ............ | 137/341 |
| 6,036,041 A * | 3/2000 | Chern | ............ | 220/6 |
| 6,173,733 B1 * | 1/2001 | Pruitt et al. | ............ | 137/382 |
| 6,206,030 B1 * | 3/2001 | Barthuly | ............ | 137/341 |
| 6,293,301 B1 * | 9/2001 | Griffin et al. | ............ | 137/377 |
| 6,311,720 B1 * | 11/2001 | Griffin et al. | ............ | 137/341 |
| 6,520,201 B2 * | 2/2003 | Sweeney et al. | ............ | 137/377 |
| 6,532,985 B1 * | 3/2003 | Griffin et al. | ............ | 137/341 |
| 6,820,639 B2 * | 11/2004 | Petschek | ............ | 137/382 |
| 2001/0018926 A1* | 9/2001 | Griffin et al. | ............ | 137/341 |

(Continued)

*Primary Examiner*—Anthony Stashick
*Assistant Examiner*—Christopher McKinley
(74) *Attorney, Agent, or Firm*—Arthur G. Yeager

(57) ABSTRACT

A collapsible enclosure includes a roof, a rear wall, a pair of sidewalls, a front wall, each wall having an outside and inside surface and an open bottom. The cover includes heat insulation material covering substantially all of each inside surface of each wall. A hinge pivotally mounts the roof to rear wall and a hinge pivotally mounts each side wall to the rear wall. Bolt fasteners removably attach the front wall between the side walls. A heating element is disposed within the housing. The front wall includes an upper panel and a lower panel mounted together by a hinge in a manner to allow the upper panel to be foldable outwardly and downwardly to position the outside surface of the upper panel against the outside surface of the lower panel.

18 Claims, 4 Drawing Sheets

U.S. PATENT DOCUMENTS

2002/0066483 A1* 6/2002 Sweeney et al. ............ 137/377
2003/0019870 A1* 1/2003 Ekerot et al. .............. 220/23.2
2003/0168452 A1* 9/2003 Prutkin et al. ................. 220/6
2005/0056315 A1* 3/2005 Owens et al. ............... 137/382

* cited by examiner

COLLAPSIBLE ENCLOSURE

CROSS-REFERENCE TO RELATED APPLICATION

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to collapsible enclosures and particularly to insulated collapsible enclosures.

2. Relevant Art

It is well known that water lines and other equipment that is exposed to the atmosphere and cold temperatures need protection from freezing, for example. Many pipelines are run underground for this reason as well as for aesthetic reasons of removing the pipelines from sight. The problems of maintenance, access and operation of components in the pipeline, however, make it impractical to have every portion of the line underground. Backflow preventers must vent to the atmosphere making burial impossible and installation in a floodable pit impractical. The compromise in many installations is to bury the pipeline except for the sections having valves and backflow preventers, which must be adjusted or serviced. These sections are positioned just above ground level with the pipeline upstream and downstream from the valve sections being underground. These exposed sections are positioned just above ground level with the pipeline upstream and downstream from the valve sections being underground. These exposed sections are subject to freezing and vandalism and becoming inoperable unless they are protected from the weather.

What is needed is a cover that may be heated if desired for outdoor components primarily of water systems. Moreover, the enclosure should be modular for easy assembly or disassembly, to save freight costs and warehouse space and for ease and speed of installation at a given site.

BRIEF SUMMARY OF THE INVENTION

In one aspect of the present invention there is provided a collapsible enclosure comprising a housing defining an outside surface and an inside surface formed of a roof, a rear wall, a pair of side walls, a front wall and an open bottom, first hinge for affixing the roof to the rear wall, second hinge for affixing each side wall to the rear wall, fastener means for releasably attaching the front wall between the side walls. The enclosure includes insulation covering substantially all of the inside surface. The front wall includes an upper panel having an upper and lower portion, and a lower panel having an upper and lower portion, third hinge for pivotally mounting the lower portion of the upper panel to the upper portion of the lower panel. Also included is fastener means for releasably attaching the lower panel between the side walls. The fastener means includes bolt means.

The roof includes a downwardly disposed flange extending substantially the entire length of the side portion of the roof, each flange being located laterally outwardly of and adjacent to the side wall. The roof also includes a downwardly disposed flange extending substantially the entire width of the roof, the flange being located laterally outwardly of and adjacent to the front wall. Each of the rear wall; the side wall; and the front wall include a resilient member thereon for providing a tight seal between the walls and the roof. The second pivot hinge mounts the side walls to the rear wall in a manner such that the side walls are foldable to position an inside surface of the side wall against an inside surface of the rear wall. At least one side wall includes an opening adjacent the open bottom to drain water from inside the housing. The first hinge mounts the roof to the rear wall in a manner such that the roof is foldable outwardly to position the roof against an outside surface of the rear wall. There is also sealing means located between each side wall and the rear wall.

In another aspect of the present invention there is provided a collapsible enclosure comprising a first module including a rear wall having an upper and lower portion and opposite end portions and outside and inside surfaces, a roof having a rear portion and front portion and outside portion and an inside surface and opposite end portions, a first hinge for pivotally mounting the rear portion of the roof to the upper portion of the rear wall. First and second side walls each have a rear portion and a front portion and an outside and inside surface, a pair of second hinges for respectively pivotally mounting the rear portion of each side wall to each end portion of the rear wall, and a second module including a front wall having upper and lower edge portions and opposite end portions, the end portions of the front wall, being releasably attached to the respective front portions of the side walls. The front wall includes an upper panel having an upper and lower portion, and a lower panel having an upper and lower portion, third hinge for pivotally mounting the lower portion of the upper panel to the upper portion of the lower panel. There is fastener means for releasably attaching the front wall to the first module, which includes bolt means for affixing the front wall between the front portions of the side walls. There is also fastener means for releasably attaching one respective end portion of the lower panel to the front portion of the respective side wall. Each end portion of the roof includes a downwardly disposed flange extending substantially the entire length of the side portion of the roof, each flange being located laterally outwardly of and adjacent to the side wall. Each of the upper portions of the rear wall; the upper portion of each side wall; and the upper edge portion of the front wall includes a resilient member thereon for providing a tight seal between the resilient members and the inside surface of the roof when the roof is placed on the walls. The second hinge mounts the side walls to the rear wall in a manner such that the side walls are foldable to position the inside surface of the side wall against the inside surface of the rear wall. Each end portion of the roof includes a downwardly disposed flange extending substantially the entire length of the side portion of the roof, each flange being located laterally outwardly of and adjacent to the side wall. Each of the upper portion of the rear wall; the upper portion of each side wall; and the upper edge portion of the front wall includes a resilient member thereon for providing a tight seal between the resilient members and the inside surface of the roof when the roof is placed on the walls. The second hinge mounts the side walls to the rear wall in a manner such that the side walls are foldable to position the inside surface of the side wall against the inside surface of the rear wall. The first hinge mounts the roof to the rear wall in a manner such that the roof is foldable to position the outside surface of the roof against the outside surface of the rear wall.

In a further aspect of the present invention there is provided a collapsible enclosure comprising a roof, a rear wall, a pair of side walls, a front wall, each wall having an outside and inside surface and an open bottom, the roof being mountable on the rear wall, hinge for pivotally mounting each side wall to the rear wall, fastener means for removably attaching the front wall between the side walls. A heating element may be disposed within the housing. The front wall includes an upper panel having an upper and lower portion, and a lower panel having an upper and lower portion, third hinge for pivotally mounting the lower portion of the upper panel to the upper portion of the lower panel in a manner to be foldable outwardly to position the outside surface of the upper panel against the outside surface of the lower panel.

BRIEF DESCRIPTION OF THE SEVERAL VIEWS OF THE DRAWING

The novel features which are believed to be characteristic of this invention are set forth with particularity in the appended claims. The invention itself, however, both as to its organization and method of operation, together with further objects and advantages thereof, may best be understood by reference to the following description, taken in connection with the accompanying drawings, in which:

DETAILED DESCRIPTION OF THE INVENTION

Figure 1:
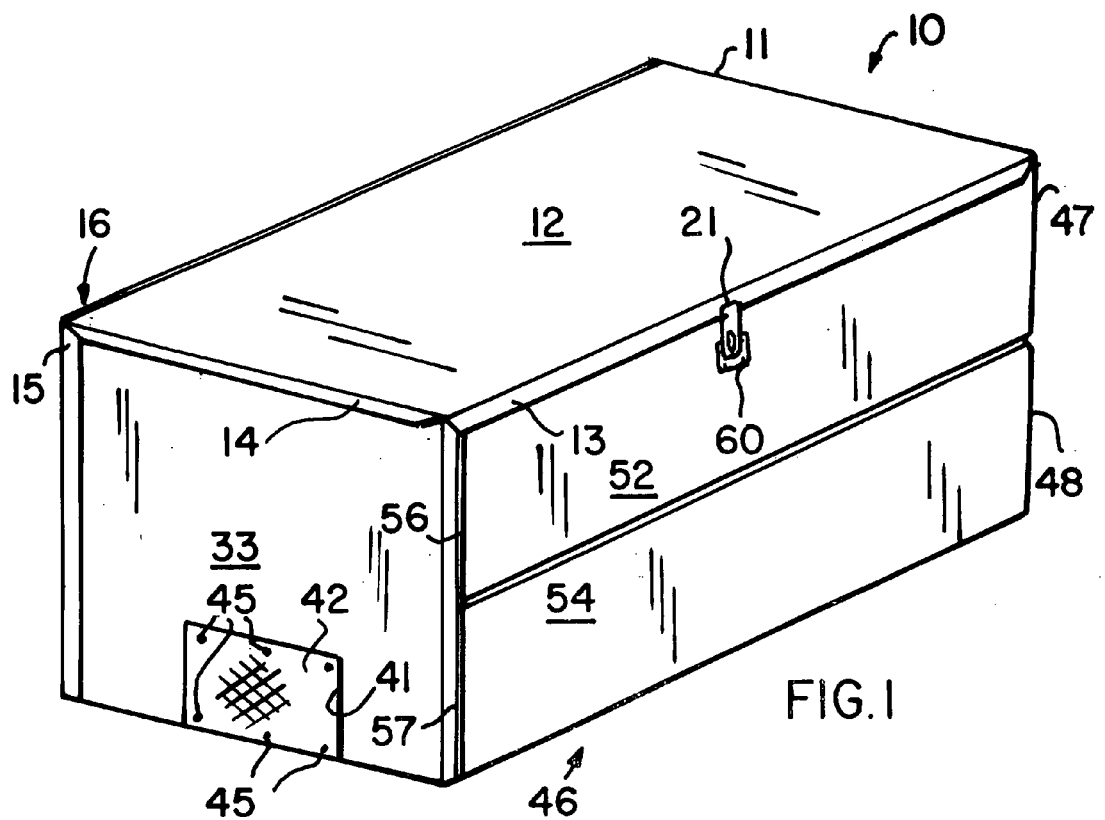
FIG. 1 is a perspective view of the collapsible enclosure in accord with the present invention shown installed.
Figure 4:
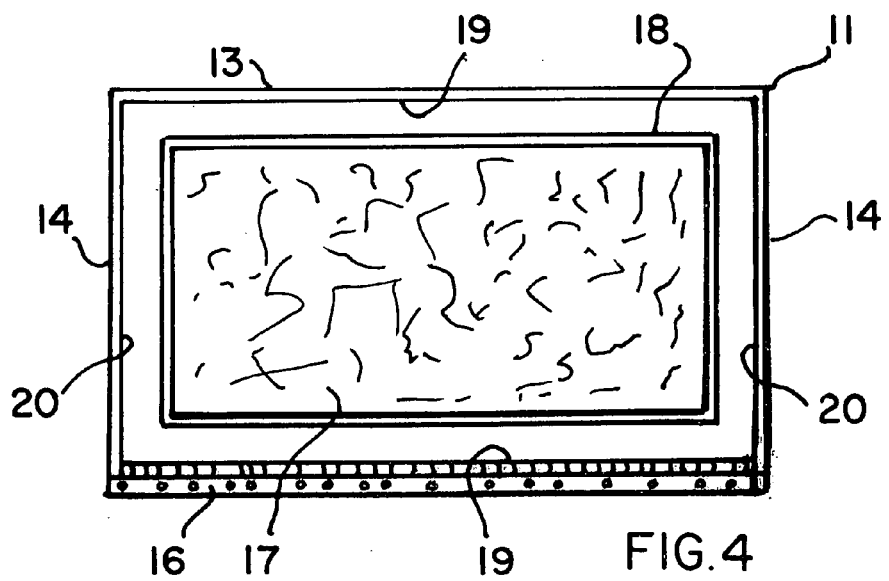
FIG. 4 is a bottom plan view of the roof of the present invention.
Figure 2:
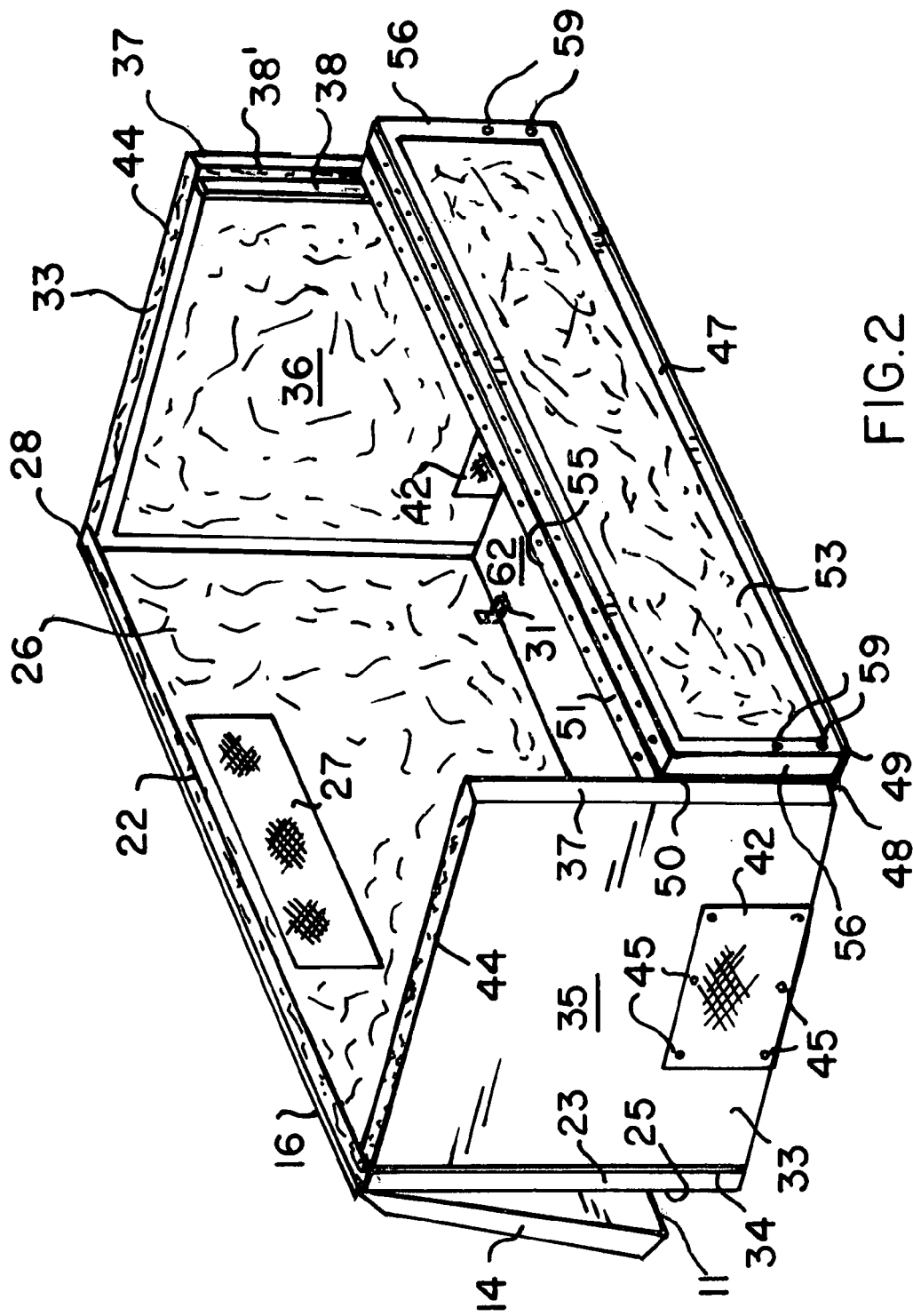
FIG. 2 is a perspective view of the enclosure of FIG. 1 at one stage of being taken down.
Figure 3:
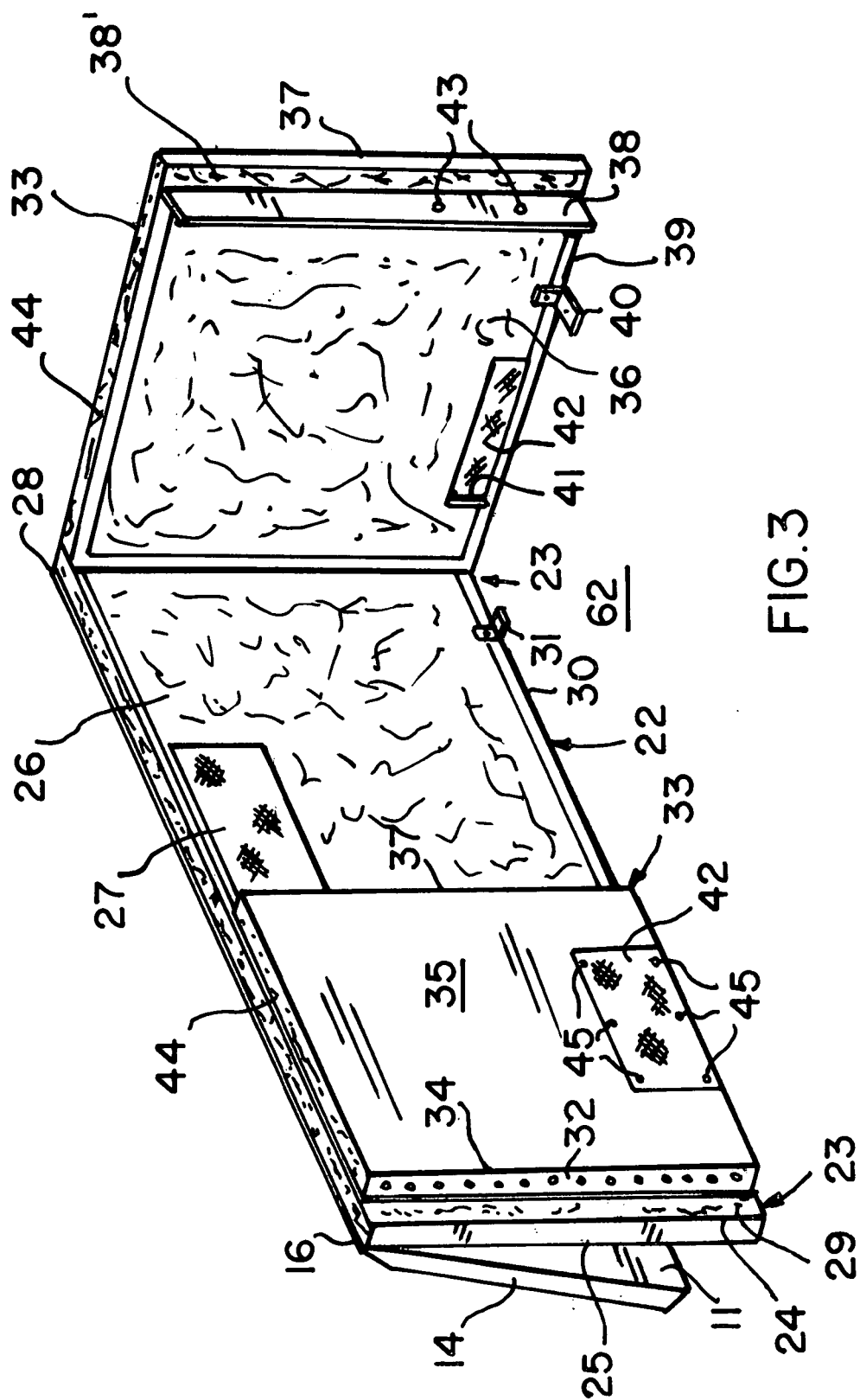
FIG. 3 is a perspective view of the enclosure of FIG. 2 at a further stage of disassembly.
Figure 5:
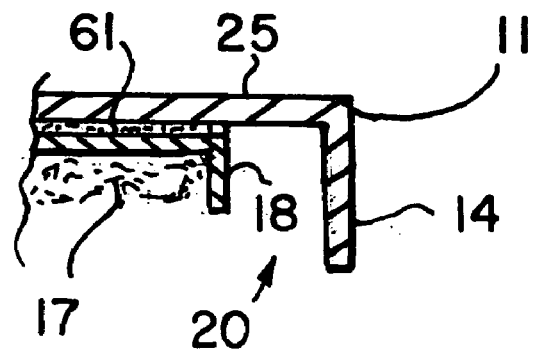
FIG. 5 is a partial cross-sectional view of a section of the roof illustrated in FIG. 4.

With regard to the drawings, an assembled enclosure formed as a housing shown generally at numeral 10 in FIG. 1. Metal or plastic roof 11 has a top surface 12, a front downwardly disposed flange 13, and two downwardly disposed side flanges 14. The rear edge portion 15 of the roof 11 has a piano hinge 16 and also includes an interior insulation layer 17 that is limited forwardly, rearwardly and sidewise to create channel-like pockets 19 and 20 as illustrated in FIGS. 4 and 5. One portion of a locking member 21 is mounted to front flange 13. Roof 11 is shown hanging slightly outwardly of rear wall 22. Hinge 16 provides for the roof to lie flat against rear wall when the enclosure is disassembled. Rear wall 22 has opposite end portions 23 and having a pair of spaced L-shaped angled extensions 24 for affixing the wall 22 to a surface as will be discussed hereinbelow. Wall 22 has an outer surface 25 and an interior insulation layer 26 and a non-insulated portion 27 where a heating unit (not shown) may be mounted as shown in FIGS. 2 and 3.

The wall 22 has an upper edge portion 28 with an elongate vertically disposed L-shaped angled extension member 24 formed therein and covered with a resilient member such as rubber gasket 29 and a lower edge portion 30 having a pair of spaced brackets 31 for mounting the wall 22 to a surface. An elongated piano hinge 32 is mounted between a side wall 33 and the extension member 24 of rear wall 22 the two side walls 33 are substantially identical and each has a rear edge portion 34, and outer surface 35, an inner insulation layer 26, and a front edge portion 37 to which an elongate L-shaped vertically disposed angled extension member 38 with rubber gasket 38' with a pair of bolt holes 43.

Each wall 33 has a resilient member such as rubber gasket 44 on the upper edge and a lower edge portion 39 which has at least one bracket 40 attached thereto to mount the side wall 33 to a surface.

Each side wall 33 has a drain opening 41 at portion 39 with a screen 42 over the opening 41 mounted via screws 45.

Front wall 46 is constructed of an upper panel 47 and a lower panel 48 connected via a piano hinge 51 mounted between lower edge 50 of upper panel 47 and the upper edge portion 49 of lower panel 48. The upper edge portion 49 of said upper panel 47 includes a resilient member such as a rubber gasket.

Each panel 47, 48 has respective outer surface 52, 54, insulation layers 53, 55 and end edge portions 56, 57. The bottom edge 58 of lower panel 48 rests on a surface. The end edge portions 57 have bolt holes 59 for securing front wall 46 to vertical member 38 via bolt holes 43. A second part 60 of a locking member is located on upper edge 49 of panel 47.

FIGS. 4 and 5 illustrate details of the inside of roof 11. A large metal L-shaped member 18 is secured via adhesive 62. The channel-like portions or pockets 19 and 20 rest on the upper surfaces of the rear wall 22, side walls 33 and front wall panel 47 all of which are covered with rubber gasket material as discussed hereinabove.

Figure 6:
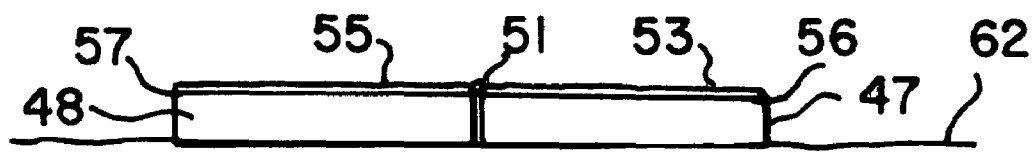
FIG. 6 is a side view of the front wall of the enclosure in stored position.

The enclosure 10 is stored and transported by folding side walls 33 inwardly against the inside surface 26 of rear wall 22 in FIG. 3. The roof 11 is folded outwardly and downwardly to position the top outside surface 12 against the outside surface 25 of rear wall 22. The two panels 47, 48 of front wall 46 are laid flat on surface 62 as shown in FIG. 6.

Access to the components inside the enclosure 10 as installed is accomplished by unlocking and lifting roof 11 and if desired by then pivoting upper panel 47 outwardly and downwardly as shown in FIG. 2.

While the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

What is claimed as new and what it is desired to secure by Letters Patent of the United States is:

1. A collapsible enclosure for backflow preventers in a water pipeline above ground components comprising a housing defining an outside surface and an inside surface formed of a roof, a rear wall, a pair of side walls, a front wall and an open bottom, first hinge for affixing said roof to said rear wall, a pair of second hinges for affixing respective said side wall to said rear wall, said front wall including an upper panel having an upper and lower portion, and a lower panel having an upper and lower portion, third hinge for pivotally mounting said lower portion of said upper panel to said upper portion of said lower panel, fastener means for releasably attaching said lower panel between said side walls, each of said walls and said roof being planar and continuous to protect the above ground components from the weather and insulation covering substantially all of said inside surface of said housing.

2. The enclosure of claim 1 wherein said roof includes a pair of downwardly disposed flanges extending substantially the entire length of said side portion of said roof, each said flange being located laterally outwardly of and adjacent to respective said side walls.

3. The enclosure of claim 1 wherein said roof includes a downwardly disposed flange extending substantially the entire width of said roof, said flange being located laterally outwardly of and adjacent to said front wall, said flange of said roof maintaining said upper panel of said front wall in substantially the same plane as said lower panel until said roof is raised so that said flange of said roof is above an upper free edge of said upper panel to permit pivoting of said upper panel on said third flange to a position alongside of said lower panel.

4. The enclosure of claim 1 further comprising a plurality of resilient members located on respective said rear wall, said side walls, and said front wall for providing a tight seal between all said walls and said roof.

5. The enclosure of claim 1 wherein said second pair of hinges mounts said side walls to said rear wall in a manner such that said side walls are foldable to position an inside surface of said side wall against an inside surface of said rear wall.

6. The enclosure of claim 1 wherein at least one said side wall includes an opening adjacent said open bottom to drain water from inside said housing a screen covering said opening and attached to at least one said side wall.

7. The enclosure of claim 1 wherein said first hinge mounts said roof to said rear wall in a manner such that said roof is foldable outwardly to position said roof against an outside surface of said rear wall.

8. The enclosure of claim 1 further including resilient sealing means located between each said side wall and said rear wall and said front wall.

9. A collapsible enclosure for backflow preventers in a water pipeline above ground components comprising a first module including a rear wall having an upper and lower portion and opposite end portions and outside and inside surfaces, a roof having a rear portion and a front portion and an outside portion and an inside surface and opposite end portions, first hinge for pivotally mounting said rear portion of said roof to said upper portion of said rear wall, and a first and second side walls each having a rear portion and a front portion and an outside and inside surface, a pair of second hinges for respectively pivotally mounting said rear portion of each said side wall to each said end portion of said rear wall, and a second module including a front wall having upper and lower edge portions and opposite end portions, said end portions of said front wall being releasably attached to respective said front portions of said side walls, said front wall including an upper panel having an upper and lower portion, and a lower panel having an upper and lower portion, third hinge for pivotally mounting said lower portion of said upper panel to said upper portion of said lower panel, fastener means for releasably attaching said lower panel of said front wall to said first module.

10. The enclosure of claim 9 wherein each said end portion of said roof includes a pair of downwardly disposed flanges extending substantially the entire length of said side portion of said roof, each said flange being located laterally outwardly of and adjacent to respective said side walls.

11. The enclosure of claim 9 wherein each of said upper portion of said rear wall, said upper portion of each said side wall, and said upper edge portion of said front wall includes a resilient member thereon for providing a tight seal between said resilient members and said inside surface of said roof when said roof is placed on said walls.

12. The enclosure of claim 9 further including a heating element disposed within said housing, each said wall and said roof carrying insulation internally of said enclosure.

13. The enclosure of claim 9 wherein said front wall includes an upper panel having an upper and lower portion, and a lower panel having an upper and lower portion, third hinge for pivotally mounting said lower portion of said upper panel to said upper portion of said lower panel in a manner to be foldable outwardly to position said outside surface of said upper panel against said outside surface of said lower panel.

14. A collapsible enclosure for backflow preventers in a water pipeline above ground components comprising a housing having a roof, a rear wall, a pair of side walls, a front wall and an open bottom, a first hinge for affixing said roof to at least one upper edge portion of at least one said wall, at least one of said front and back walls including a second hinge substantially medially thereof for dividing said at least one of said front and back walls into equal area portions, said first and second hinge being remotely located and attached to different said walls, first resilient members between said front and back walls and said side walls to provide a tight seal therebetween, second resilient members between said roof and upper edges of said side walls and said front and back walls to tightly seal said roof thereto, and said walls and roof being planar and continuous to protect the above ground components from the weather.

15. The enclosure of claim 14 wherein said roof includes a pair of side portions and a pair of downwardly disposed flanges extending substantially the entire length of said side portions of said roof, each said flange being located laterally outwardly of and adjacent to respective said side walls.

16. The enclosure of claim 14 wherein said roof includes a downwardly disposed flange extending substantially the entire width of said roof, said flange being located laterally outwardly of and adjacent to said front wall, said flange of said roof maintaining one said equal area portion of said front wall in substantially the same plane as another said equal area portion until said roof is raised so that said flange of said roof is above an upper free edge of said one equal area portion to permit pivoting of said one equal area portion on said second hinge to a position alongside of said another equal area portion.

17. The enclosure of claim 14 wherein at least one said side wall includes an opening adjacent said open bottom to drain water from inside said housing, a screen covering said opening and attached to at least one said side wall.

18. The enclosure of claim 14 further including a heating element disposed within said housing, each said wall and said roof carrying insulation internally of said enclosure.

* * * * *